US007862264B2

(12) United States Patent
Sherlock et al.

(10) Patent No.: US 7,862,264 B2
(45) Date of Patent: Jan. 4, 2011

(54) METHOD AND APPARATUS TO SECURE A COMPONENT IN POSITION FOR FABRICATION

(75) Inventors: Graham David Sherlock, Greenville, SC (US); Lynn Charles Gagne, Simpsonville, SC (US); Larry Paul Wencil, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 982 days.

(21) Appl. No.: 11/679,505

(22) Filed: Feb. 27, 2007

(65) Prior Publication Data

US 2008/0206005 A1 Aug. 28, 2008

(51) Int. Cl.
*B23B 35/00* (2006.01)
*B23B 47/28* (2006.01)
(52) U.S. Cl. .................................. 408/1 R; 408/115 R
(58) Field of Classification Search ............... 408/72 R, 408/97, 103, 115 R, 202, 241 B, 1 R, 95
See application file for complete search history.

(56) References Cited

U.S. PATENT DOCUMENTS

| 1,267,704 | A | * | 5/1918 | Skrukrud ................... 408/191 |
| 2,315,318 | A | * | 3/1943 | Deubler, Jr. ................. 408/97 |
| 2,344,143 | A | * | 3/1944 | Harding ...................... 408/192 |
| 2,369,425 | A | * | 2/1945 | Becker ........................ 269/85 |
| 2,497,733 | A | | 2/1950 | Kebour |
| 2,847,883 | A | * | 8/1958 | Bagby ........................ 408/105 |
| 3,065,656 | A | * | 11/1962 | Clinkenbeard ............... 408/97 |
| 3,204,266 | A | * | 9/1965 | Carter, Jr. et al. ............. 470/58 |
| 3,313,188 | A | * | 4/1967 | Abernethy ................... 408/97 |
| 3,537,337 | A | * | 11/1970 | Best ............................ 408/95 |
| 3,708,237 | A | * | 1/1973 | Kruse ......................... 408/108 |
| 3,759,504 | A | * | 9/1973 | Hildebrand .................. 269/87 |
| 4,194,861 | A | | 3/1980 | Keller |
| 4,196,897 | A | | 4/1980 | Gordon |
| 4,601,618 | A | | 7/1986 | McEldowney |
| 4,790,695 | A | * | 12/1988 | Abernethy .............. 408/115 R |
| 5,044,616 | A | | 9/1991 | Jakob |
| 5,163,792 | A | | 11/1992 | Slavik |
| 5,222,845 | A | | 6/1993 | Goldstein et al. |
| 5,746,550 | A | | 5/1998 | Iacono et al. |
| 6,254,320 | B1 | | 7/2001 | Weinstein et al. |
| 6,305,886 | B1 | | 10/2001 | Womack |
| 6,486,436 | B1 | | 11/2002 | Shah et al. |
| 6,508,613 | B2 | | 1/2003 | Cline et al. |
| 6,560,890 | B1 | | 5/2003 | Madge et al. |
| 6,729,809 | B2 | | 5/2004 | Sarh et al. |
| 6,830,240 | B2 | | 12/2004 | Jones et al. |

(Continued)

*Primary Examiner*—Daniel W Howell
(74) *Attorney, Agent, or Firm*—Armstrong Teasdale LLP (57) ABSTRACT

A method for forming an opening in two different turbine components is provided. The method includes coupling a clamp to a base and coupling the clamp to a clamp bar, wherein the clamp bar is moveable with respect to the base. A first bushing plate is selected based on a first turbine component being drilled and is removably coupled to the base. A bushing is removably coupled to at least one aperture extending through the first bushing plate. An opening is formed in the first turbine component. A second bushing plate is selected based on a second turbine component being drilled. The second turbine component is different from the first turbine component. The second bushing plate is removably coupled to the base. An opening is formed in the second turbine component.

20 Claims, 6 Drawing Sheets

U.S. PATENT DOCUMENTS

| | | |
|---|---|---|
| 6,931,751 B2 | 8/2005 | LaTulippe |
| 7,101,123 B1 | 9/2006 | Weinstein et al. |
| 7,134,814 B1 | 11/2006 | Park |
| 7,641,425 B2 * | 1/2010 | Sommerfeld et al. .... 408/115 R |

* cited by examiner

METHOD AND APPARATUS TO SECURE A COMPONENT IN POSITION FOR FABRICATION

BACKGROUND OF THE INVENTION

This invention relates generally to a tool used to secure a component during fabrication, and, more specifically, to a tool used to secure a blade assembly during fabrication.

Some known turbines include a compressor section used to compress fluid channeled towards a turbine. Some known compressors include a row of blades secured to the compressor casing. Accurate manufacturing of gas turbine engine components may be a significant factor in determining both manufacturing timing and cost. For example, when the component is a gas turbine engine compressor assembly, accurate manufacturing of the compressor blades and/or compressor blade segments may be a significant factor affecting an overall cost of fabrication of the gas turbine engine, as well as subsequent modifications, repairs, and inspections of the blade.

Apertures and/or holes may be formed in turbine components, such as, blades and blade segments. Such apertures and/or holes may be required to align with holes and/or apertures formed in other turbine components. The measurements for the positions of the apertures and/or holes may not be the same causing mis-alignment of apertures and/or holes of one turbine component with the apertures and/or holes of an adjacent turbine component.

To align a component for manufacture, the component may be coupled to a fixture that includes at least one surface that locates a plurality of datums on the component. However, accurately aligning the component and holding the component in such alignment during manufacturing processes may be difficult. Moreover, it may be difficult to load and/or unload the component from the fixture when the fixture is positioned for such manufacturing processes. Accordingly, aligning the component may be more time consuming and/or require specialized operator training, possibly increasing manufacturing cycle times and manufacturing costs. Furthermore, some machined surfaces may include datums that are used to locate the component for subsequent manufacturing processes. An accuracy of the dimensions of such machined surfaces may therefore determine an accuracy of the dimensions of other surfaces of the component that are subsequently machined, as well as the overall dimensions of the finished component. Moreover, it may be difficult to check that the component is positioned in a desired location and/or orientation when the fixture is positioned for such manufacturing processes.

Furthermore, forming the apertures and/or holes in a turbine component may be a time-consuming and costly undertaking. Known turbines each have blades and/or segments that are sized and configured differently depending on the turbine and the position within the turbine. Each of these differently configured blades and/or segments may require apertures and/or holes placed in different positions to facilitate reducing material fatigue around the aperture and/or hole. Determining and measuring an optimal position for the apertures and/or holes may also be time-consuming and costly.

BRIEF DESCRIPTION OF THE INVENTION

In one aspect a method for forming an opening in two different turbine components is provided. The method includes coupling a clamp to a base and coupling the clamp to a clamp bar, wherein the clamp bar is moveable with respect to the base. A first bushing plate is selected based on a first turbine component being drilled and is removably coupled to the base. A bushing is removably coupled to at least one aperture extending through the first bushing plate. An opening is formed in the first turbine component. A second bushing plate is selected based on a second turbine component being drilled. The second turbine component is different from the first turbine component. The second bushing plate is removably coupled to the base. An opening is formed in the second turbine component.

In another aspect a drilling tool for two different turbine components is provided. The drilling tool includes a base, a clamp coupled to the base, and a clamp bar coupled to the clamp. The clamp bar is moveable with respect to the base. The drilling tool further includes a first bushing plate having at least one aperture extending therethrough. The first bushing plate is removably coupled to the base and is selected based on a first engine component being drilled. The drilling tool includes a second bushing plate having at least one aperture extending therethrough. The second bushing plate is removably coupled to the base and is selected based on a second engine component being drilled. The second turbine component is different from the first engine component. A bushing is removably coupled to at least one of the first bushing plate aperture and the second bushing plate aperture.

In a further aspect drilling assembly for forming an opening in a plurality of blades is provided. The drilling assembly includes a base, a clamp coupled to the base, and a clamp bar coupled to the clamp. The clamp bar is moveable with respect to the base. The drilling assembly further includes a first bushing plate having an aperture extending therethrough. The first bushing plate is removably coupled to the base and is selected based on a first turbine blade being drilled. The drilling assembly includes a second bushing plate has an aperture extending therethrough. The second bushing plate is removably coupled to the base and is selected based on a second turbine blade being drilled. The second turbine blade is different from the first turbine blade. A bushing is removably coupled to at least one of the first bushing plate aperture and the second bushing plate aperture. The assembly further includes a drill bit coupled to a drill, a collar coupled to the drill bit to facilitate maintaining such that a drill depth, and a drill stand configured to facilitate maintaining a position of the base with respect to the drill bit.

DETAILED DESCRIPTION OF THE INVENTION

Figure 1:
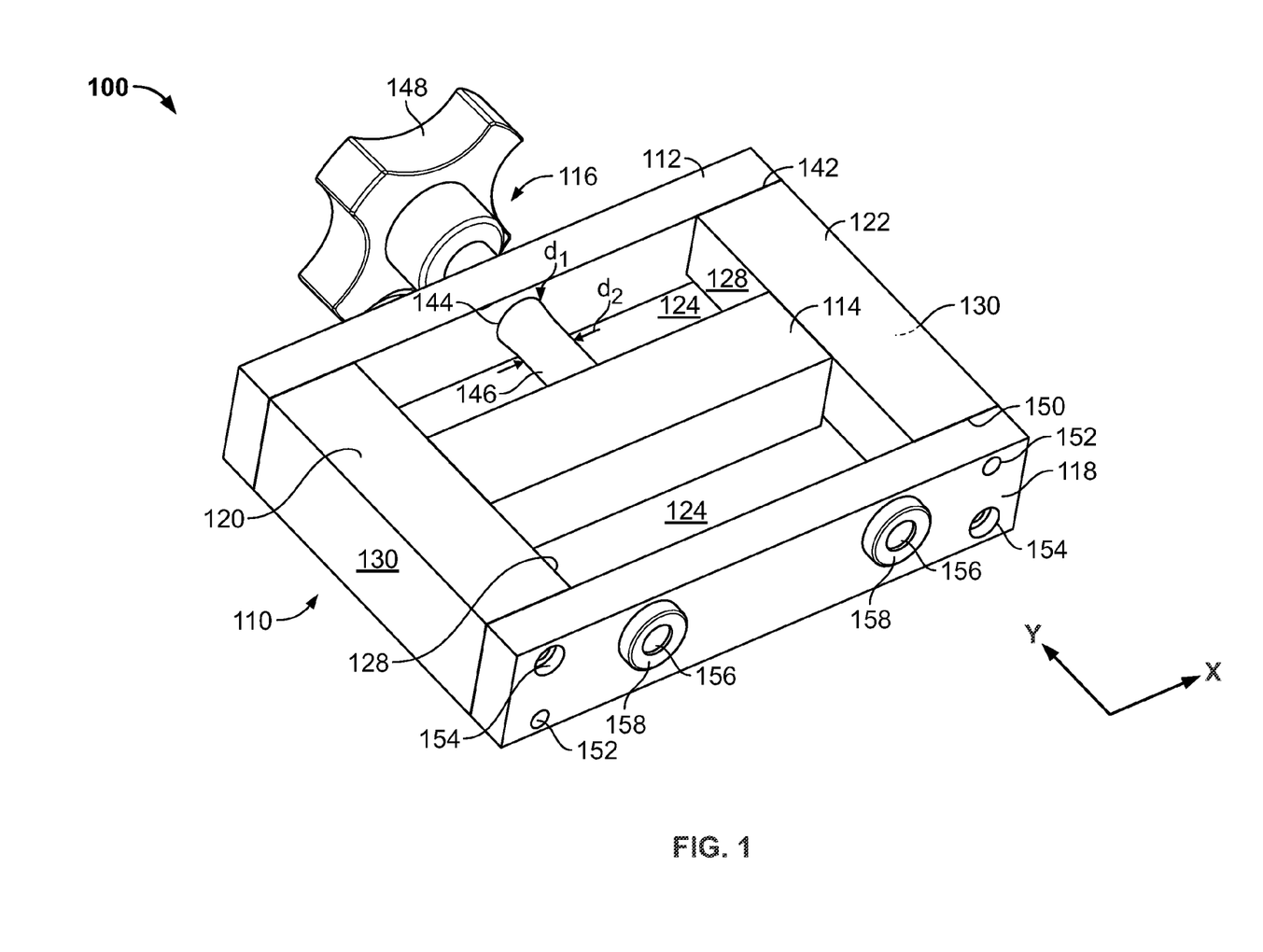
FIG. 1 is perspective view of an exemplary clamp fixture that may be used with a blade assembly.
Figure 2:
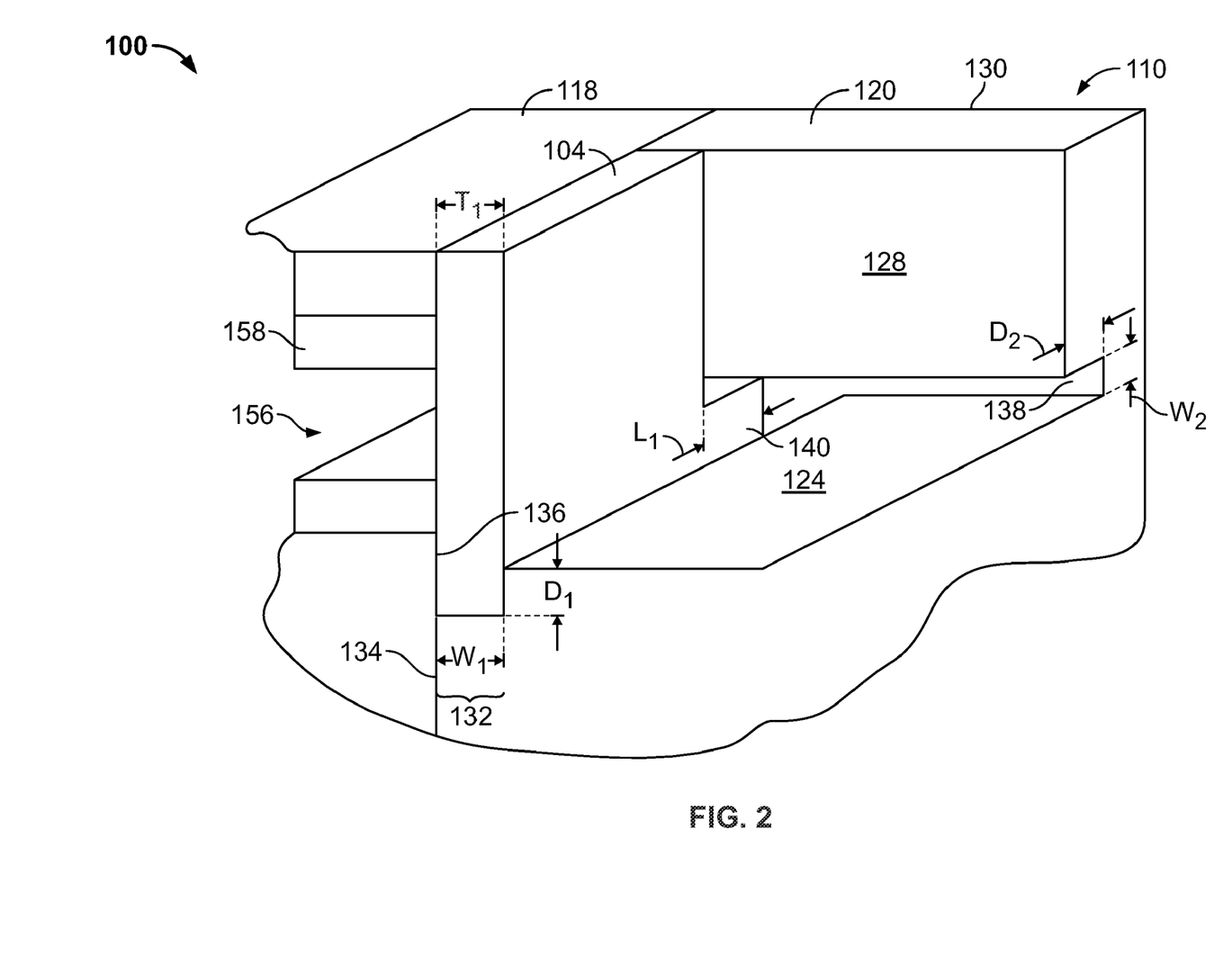
FIG. 2 a perspective view of the clamp fixture shown in FIG. 1.
Figure 3:
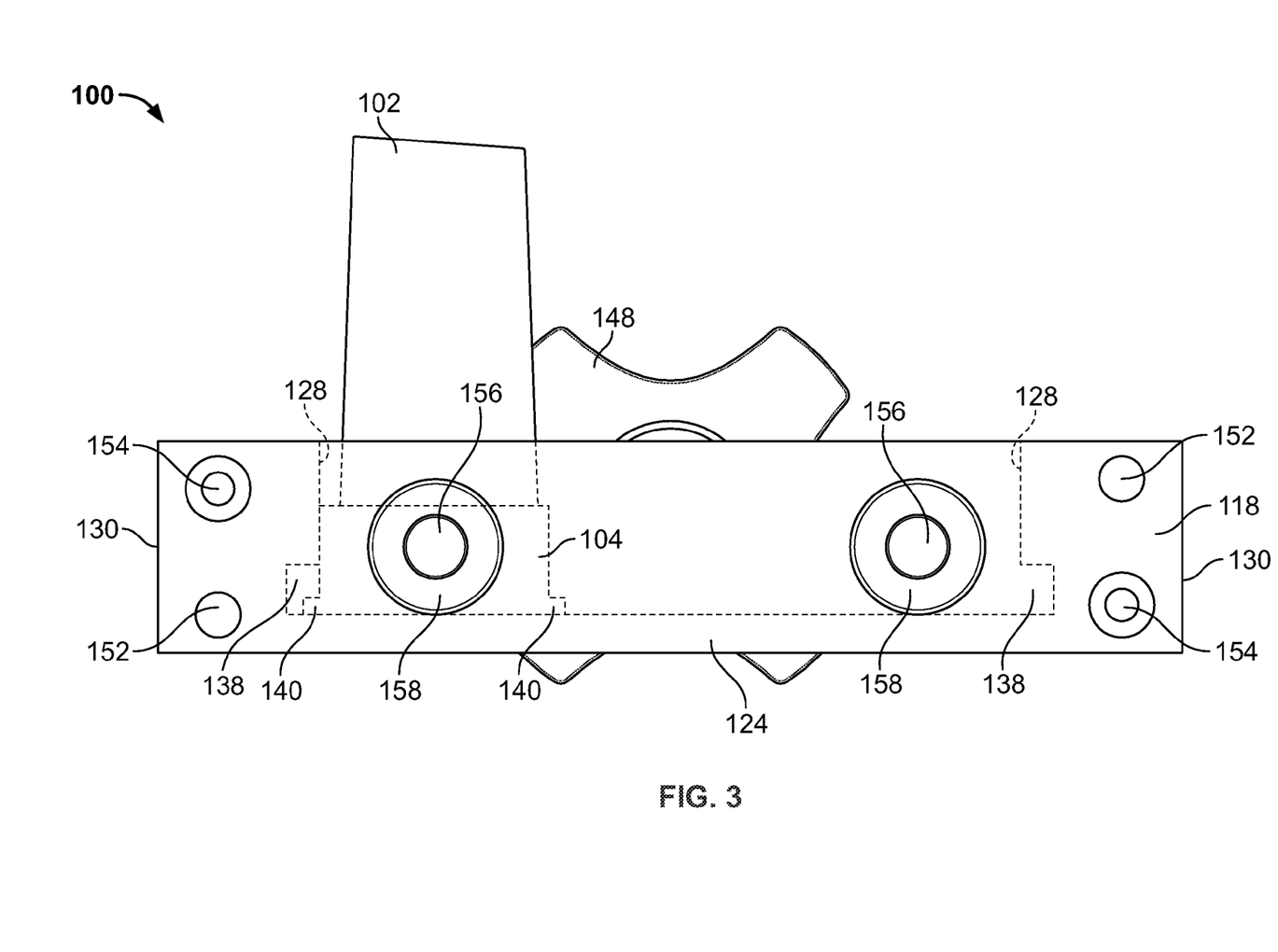
FIG. 3 is a top view of the clamp fixture shown in FIG. 1.
Figure 4:
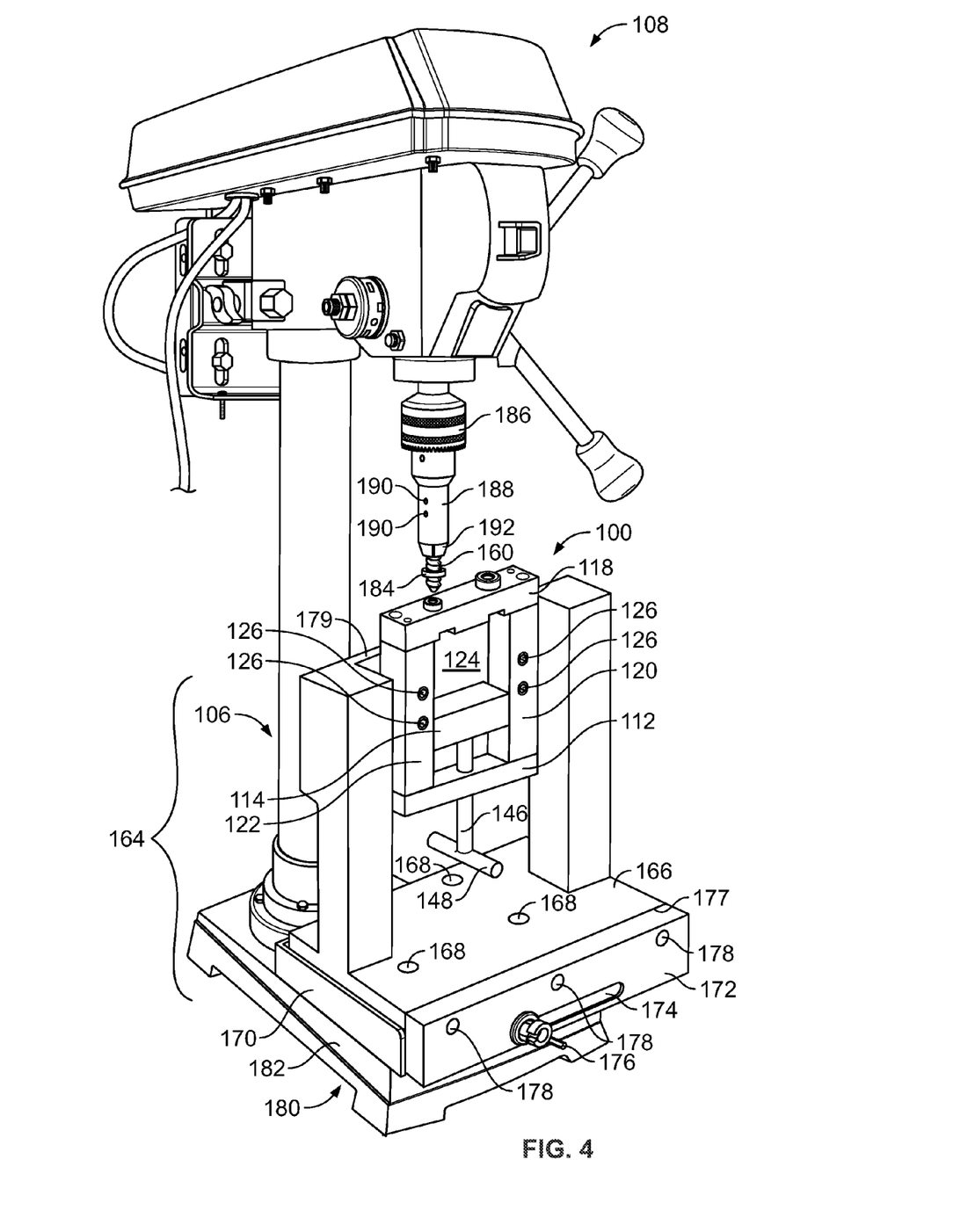
FIG. 4 is a perspective view of the clamp fixture, shown in FIG. 1 and coupled to a drill press.

FIG. 1 shows perspective view of an exemplary clamp fixture 100 that may be used with a square base blade 102 (shown in FIG. 3). FIG. 2 shows a perspective view of clamp fixture 100. FIG. 3 shows a top view of clamp fixture 100 including square base blade 102 and a shim 104 positioned therein. FIG. 4 shows a perspective view of clamp fixture 100 coupled to an exemplary drill stand 106 coupled to a drill press 108. In the exemplary embodiment, clamp fixture 100 facilitates securing blade 102 and shim 104 in place such that a hole (not shown) formed in a blade base (not shown) and an aperture (not shown) extending through shim 104 remain substantially aligned during fabrication of the hole and/or the aperture. In the exemplary embodiment, blade 102 and shim 104 are coupled together via a rivet (not shown) that is inserted through the aperture extending through shim 104 and the hole defined in blade 102.

In the exemplary embodiment, clamp fixture 100 is configured to be used with a solid square base blade 102 such as, but not limited to, a Frame 6 blade, a Frame 7 blade, and/or a Frame 9 blade. Furthermore, in the exemplary embodiment, blade 102 is other than a hollow base blade (not shown). In another exemplary embodiment, clamp fixture 100 is configured to be used with a solid diamond base blade (not shown), for example, but not limited to, a 7FA+e stage 17 blade. In a further exemplary embodiment, clamp fixture 100 is configured to be used with a solid rectangular base blade (not shown), for example, but not limited to, a 7FA+e EGV blade.

In the exemplary embodiment, clamp fixture 100 includes a base 110, a clamp plate 112, a clamp bar 114, a screw assembly 116, and a bushing plate 118. More specifically, in the exemplary embodiment, base 110 includes two side walls 120 and 122 and a back side 124. Side walls 120 and 122 are coupled to back side 124 using welding, fasteners 126, or any other suitable coupling method. Alternatively, side walls 120 and 122 and back side 124 may be formed unitarily. When fixture is configured for use with a square or rectangular base blade, an inner surface 128 of side walls 120 and 122 is substantially parallel to an outer surface 130 of side walls 120 and 122. Alternatively, when fixture 100 is configured for use with a diamond base blade, inner surface 128 may be oriented at any orientation to outer surface 130 such that one side wall inner surface 128 is substantially parallel to the opposite side wall inner surface 128.

Furthermore, in the exemplary embodiment, base 110 has a groove 132 defined therein. More specifically, groove 132 is defined in a top face 134 of base 110 such that shim 104 may be positioned a depth $D_1$ into back side 124 and adjacent to a bottom side 136 of bushing plate 118. In the exemplary embodiment, groove 132 has a width $W_1$ that is slightly greater than a thickness $T_1$ of a shim 104.

In the exemplary embodiment, base 110 also includes a channel 138 defined between back side 124 and each side wall 120 and 122. More specifically, channel 138 is sized and oriented to retain a shim tab 140 and/or a blade flange (not shown) therein. In the exemplary embodiment, channel 138 has a depth $D_2$ and width $W_2$. In the exemplary embodiment, depth $D_2$ is longer than tab length $L_1$ and a flange depth (not shown), and width $W_2$ is wider than a height (not shown) of tab 140 and a height (not shown) of the flange. Alternatively, channel depth $D_2$ may be approximately equal to or less than tab length and/or flange depth, and channel width $W_2$ may be approximately equal to or less than tab height and/or flange height.

In the exemplary embodiment, clamp plate 112 is oriented adjacent a bottom face 142 of base 110 such that clamp plate 112 is substantially perpendicular to side wall outer surfaces 130. Clamp plate 112 may be coupled to base 110 via fasteners, welding, or other suitable means. Alternatively, clamp plate 112 may be formed unitarily with base 110. Clamp plate 112 includes an aperture 144 defined therethrough. More specifically, aperture 144 is formed with a diameter $d_1$ that is wider than a rod 146 having a diameter $d_2$. As such, rod 146 may be inserted through aperture 144.

In the exemplary embodiment, clamp bar 114 is positioned in fixture 100 such that clamp bar 114 is substantially perpendicular to side wall 120 and 122, and is substantially parallel to clamp plate 112. Alternatively, when fixture 100 is configured for use with a diamond base blade, clamp bar 114 is oriented obliquely to an inner surface of the side walls and is substantially perpendicular to side wall outer surfaces 130. In the exemplary embodiment, clamp bar 114, clamp plate 112, and bushing plate 118 are aligned in a direction that is substantially parallel to an x-axis. As such, clamp bar 114 is movable within fixture 100 in a direction that is parallel to a y-axis such that blade 102 and shim 104 may be secured between clamp bar 114 and bushing plate 118. Furthermore, clamp plate 114 is coupled to rod 146 such that when a handle 148 coupled to rod 146 is rotated, clamp plate 114 moves with respect fixture 100.

In the exemplary embodiment, screw assembly 116 includes rod 146 and handle 148. More specifically, handle 148 may be coupled to rod 146 via welding, screwing, or any other suitable means. In the exemplary embodiment, handle 148 is threadably coupled to rod 146. Alternatively, rod 146 is configured to move clamp bar 114 within fixture 100. In one embodiment, screw 116 is a thumb screw.

In the exemplary embodiment, bushing plate 118 is coupled to base 110. More specifically, bushing plate 118 is coupled to a top edge 150 of base 110 via dowels 152 and fasteners 154. Alternatively, bushing plate 118 may be coupled to base 110 via and other suitable coupling means, such as, but not limited to, screws, nails, and/or pins, such that bushing plate 118 is removably coupled to base 110. In the exemplary embodiment, bushing plate 118 may be replaced with another bushing plate 118 that corresponds to the type of blade 102 to be drilled in fixture 100. Alternatively, bushing plate 118 is permanently secured to base 110.

In the exemplary embodiment, bushing plate 118 includes two apertures 156 defined therethrough. Alternatively, bushing plate 118 may include more or less than two apertures 156. Apertures 156 are positioned based on the type of blade 102 being fabricated. Each aperture 156 is sized to receive a bushing 158 therein. Each bushing 158 is removable such that bushings 158 may be changed based on the size of drill bit 160 being used.

Fixture 100 may be used to align each hole defined in a base of blade 102 with each aperture extending through shim 104. The rivet may be inserted through the shim aperture and into the base hole to couple shim 104 to blade 102. In the exemplary embodiment, shim 104 may be secured to either side wall (not shown) of the blade base. When blade 102 and shim 104 are removed from a turbine (not shown), the relative positions of blade 102 and shim 104 should be noted. In the exemplary embodiment, when shim 104 is coupled between a fourth blade 102 and a fifth blade 102, shim 104 may be attached to either blade 102, such that when re-assembled in the turbine, shim 104 is positioned between the fourth blade 102 and the fifth blade 102. More specifically, in the exemplary embodiment, shim 104 is installed other than at a horizontal joint line (not shown).

In the exemplary embodiment, fixture 100 is coupled to a drill stand 106. Drill stand 106 includes an upright fixture retaining portion 164 that extends from a stand base 166. In the exemplary embodiment, stand base 166 includes a plurality of apertures 168 that extends through base 166 to provide access to clamp screws (not shown) in a drill press base plate 170. Although four apertures 168 are shown in the exemplary embodiment, alternatively, more or less than four apertures 168 may extend through stand base 166. Furthermore, drill stand 106 includes a face plate 172 that includes a slot 174 defined therethrough. A wingnut 176 may be inserted in slot 174 to secure drill stand 106 to drill press 108, as described in more detail below. In the exemplary embodiment, face plate 172 is coupled to drill stand base 166 along a front edge 177 via a plurality of fasteners 178. Alternately, face plate 172 may be coupled to stand base 166 using any other suitable means. Alternatively, face plate 172 may be formed unitarily with stand base 166.

In the exemplary embodiment, fixture 100 is removably coupled to drill stand 106 using fasteners 126 and a key (not shown). More specifically, in the exemplary embodiment, at least one fastener 126 is inserted through side wall 120, side wall 122, and/or base 110, and into a hole (not shown) defined in a stand bridge 179, and the key is removably coupled to a key slot (not shown) defined within stand bridge 179. In the exemplary embodiment, the key is coupled to the key slot using a screw or any other suitable fastening means that facilitates coupling the key to the key slot. The key is selected based on a type of blade 102 being drilled. Furthermore, in the exemplary embodiment, stand bridge 179 includes a plurality of holes (not shown) defined therethrough such that a plurality of fixture configurations, such as, but not limited to, a plurality of fixture configurations for a Frame 6 blade, a Frame 7 blade, a Frame 9 blade, a 7FA+e stage 17 blade, and/or a 7FA+e EGV blade, may be coupled to drill stand 106, as described herein. In the exemplary embodiment, base 110 includes a slot (not shown) defined within a back surface (not shown) of base 110. The base slot is sized to receive the key coupled to stand bridge 179.

In the exemplary embodiment, drill press 108 is known in the art and includes drill bit 160. In the exemplary embodiment, stand face plate 172 is adjacent to a front face (not shown) of drill press base plate 170. Wingnut 176 extends through slot 174 and is received in a hole (not shown) defined in the front face of base plate 170. The hole in the front face is sized to retain wingnut 176. In the exemplary embodiment, wingnut 176 may be loosened to enable stand 106 to be repositioned to align bushing 158 with drill bit 160. In the exemplary embodiment, base plate 170 may be adjusted and repositioned as necessary with respect to drill bit 160. More specifically, base plate 170 may be re-positioned using clamp screws that may be accessed through apertures 168 formed in stand base 166. The clamp screws may be tightened to secure base plate 170 to drill press 108.

Once fixture 100 and stand 106 are coupled to drill press 108, blade 102 and shim 104 may be positioned within fixture 100. In the exemplary embodiment, shim 104 is positioned in groove 132. More specifically, in the exemplary embodiment, blade 102 is positioned within fixture 100 below shim 104. Moreover, in the exemplary embodiment, shim 104 and blade 102 are positioned adjacent to inner surface 128 of side wall 122. Screw 116 facilitates securing blade 102 and shim 104 to fixture 100 such that clamp bar 114 contacts blade 102, and such that blade 102 contacts shim 104, such that shim 104 is secured against bushing plate bottom side 136. In another exemplary embodiment, when blade 102 is an angled blade, shim 104 and blade 102 are positioned adjacent to inner surface 128 of side wall 120.

In the exemplary embodiment, after blade 102 and shim 104 are secured within fixture 100, the aperture extending through shim 104 and the hole defined in the blade base may be drilled using drill press 108. To determine the size of drill bit 160, a diameter of the rivet is measured. In the exemplary embodiment, the rivet is used to couple shim 104 to blade 102. In the exemplary embodiment, the rivet diameter is measured at the largest set of axial knurls extending outward from the rivet. A drill bit 160 is selected based on the rivet diameter.

In the exemplary embodiment, a drill depth (not shown) may be set by positioning a drill collar 184 on drill bit 160. To determine a position for drill collar 184, a custom depth setting tool (not shown) or a vernier caliper (not shown) may be used. Alternatively, another suitable means to position collar 184 on drill bit 160 may be used. In the exemplary embodiment, vernier caliper is set to 1.570". The aperture and hole may be drilled in shim 104 and blade 102, respectively.

In the exemplary embodiment, a depth (not shown) of the aperture and the hole should be between 0.510", and 0.550". In the exemplary embodiment, to verify that the depth is within an appropriate range, blade 102 and shim 104 are removed from fixture 100. A "Go/NoGo" depth gauge (not shown) or a depth micrometer (not shown) may be used to measure the depth.

In the exemplary embodiment, after it has been determined the depth is within the range, shim 104 and blade 102 are re-secured in fixture 100, as described above. Drill bit 160 is inserted through the aperture and into the hole such that drill bit 160 contacts a bottom (not shown) of the hole. In the exemplary embodiment, a stop (not shown) is set on drill press 108. In another exemplary embodiment, collar 184 is secured to drill bit 160 such that collar 184 contacts bushing 158. In the exemplary embodiment, a plurality of shims 104 and blades 102 are formed using the above described method. Alternatively, one shim 104 and one blade 102 may be drilled.

In the exemplary embodiment, after one aperture and one hole have been drilled in each blade 102 and shim 104, drill bit 160 is removed from a chuck 186 and a countersink (not shown) is received in chuck 186. More specifically, in the exemplary embodiment, the countersink is positioned below the outer surface of shim 104 such that an outer diameter of a center drill chamfer (not shown) is positioned below the outer surface of shim 104. In the exemplary embodiment, bushing 158 may be removed to appropriately orient the countersink with respect to blade 102 and shim 104. In the exemplary embodiment, a countersink depression (not shown) that extends slightly below the outer surface of shim 104 is formed in shim 104 using the countersink. The countersink depression depth may be verified using a rivet depth gauge (not shown) or any other suitable means may be used to verify depression depth.

An alternate drilling method includes using a custom drill bit 160 rather than a standard drill bit 160. In the exemplary, drill bit 160 is a custom drill bit/countersink such that drill bit 160 includes, for example, a drill portion (not shown) and a countersink portion (not shown). The custom drill bit 160 may be used with a sidelock drill holder 188 in which drill bit 160 is received in drill holder 188 and secured in to holder 188 using screws 190. In the exemplary embodiment, bushing plate bushings 158 are selected based on a size of drill bit 160. Furthermore, in the exemplary embodiment, drill holder 188 and drill bit 160 may be configured to form the aperture and hole at an appropriate depth (not shown) by sizing drill bit 160 such that a front face 192 of drill holder 188 contacts bushing 158 when the aperture and hole at the appropriate depth. In another exemplary embodiment, small pieces of shim stock (not shown) may be inserted in the drill holder 188 to adjust the depth. The depth may be verified by using the rivet depth gauge or any other suitable means.

In the exemplary embodiment, the rivets used to secure shim 104 to blade 102 may vary in size. More specifically, it may be necessary to measure the rivets prior to assembly such that an interference fit between the rivet and the hole may be achieved. In the exemplary embodiment, a micrometer, vernier caliper, or any other suitable means may be used to measure the rivet at each set of knurls to determine the largest diameter of the rivet. If the largest rivet diameter is greater than a threshold diameter (not shown) for the aperture and hole, the aperture and hole may be re-drilled along the axial centerline of the existing hole to the appropriate depth.

In the exemplary embodiment, after the rivet is inserted through the aperture and secured within the hole, a second aperture (not shown) and a second hole (not shown) may formed in shim 104 and in blade 102. In the exemplary, embodiment, for example, some blades 102 may have two holes defined therein, and other blades 102 may have one hole defined therein, base on the type of blade 102. To form the second hole, in the exemplary embodiment, blade 102 and shim 104 are positioned adjacent inner surface 128 of side wall 120 and are re-secured within fixture 100, as described above. Furthermore, in the exemplary embodiment, some types of blades 102, may be positioned adjacent inner surface 128 of side wall 122. With blade 102 and shim 104 secured within fixture 100, the second aperture and hole may be drilled, as described above.

In the exemplary embodiment, once the required number of rivets have been inserted through the aperture(s) and secured in the hole(s), a die grinder (not shown) and abrasive discs (not shown) may be used to remove rivet material such that a side (not shown) of shim 104 is substantially flush with a side (not shown) of blade 102.

Figure 5:
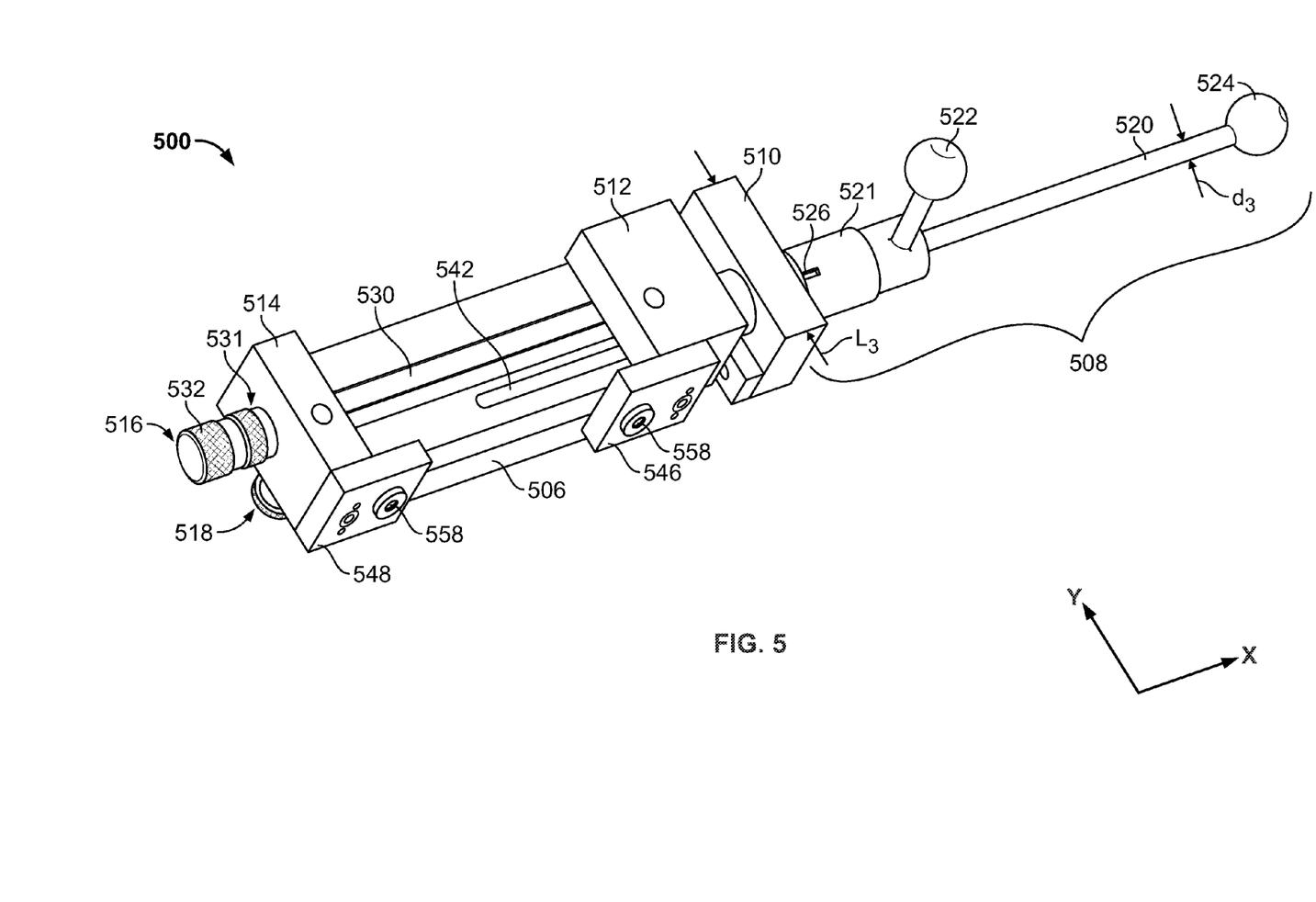
FIG. 5 is a perspective view of an alternative embodiment of a clamp fixture for use with a blade assembly.
Figure 6:
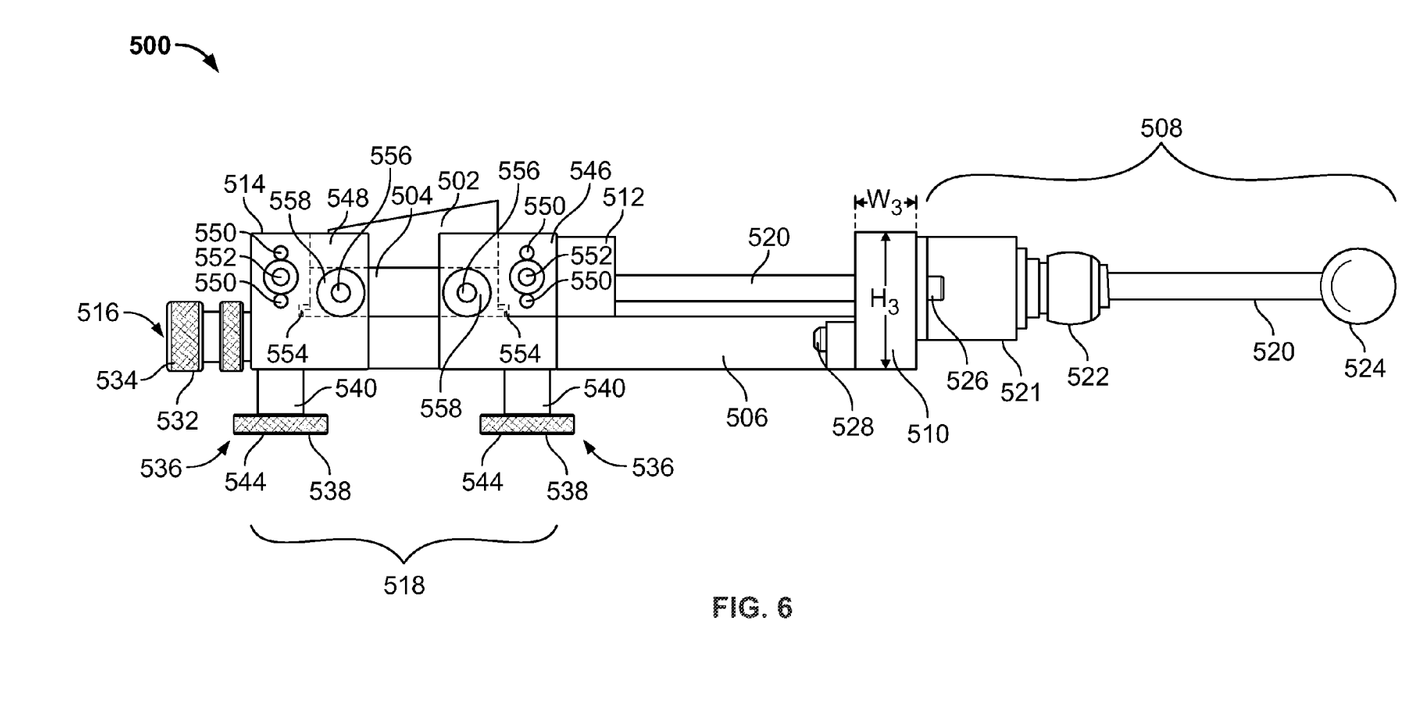
FIG. 6 is a front view of the clamp fixture shown in FIG. 5.

FIG. 5 shows a perspective view of an alternative embodiment of a clamp fixture 500. FIG. 6 shows a front view of fixture 500. In the exemplary embodiment, fixture 500 facilitated securing a blade ring segment 502 and a shim 504 in place such that a aperture (not shown) may be formed through shim 504 and a hole (not shown) may be formed in a face (not shown) of blade ring segment 502. A rivet (not shown) is inserted through the aperture and secured within the hole to form a portion of a blade assembly (not shown).

In the exemplary embodiment, fixture 500 includes a base 506, a plunger clamp assembly 508, a clamp support 510, an adjustable jaw 512, a fixed jaw 514, a cam clamp assembly 516, and a tenon clamp assembly 518. More specifically, plunger clamp assembly 508, clamp support 510, adjustable jaw 512, fixed jaw 514, cam clamp assembly 516, and tenon clamp assembly 518 are coupled to base 506.

In the exemplary embodiment, clamp support 510 has a width $W_3$, a length $L_3$, and a height $H_3$. Alternatively, clamp support 510 may be designed other than as a four sided block. Clamp support 510 has an aperture (not shown) defined therethrough. More specifically, the aperture has a diameter (not shown) sized such that a rod 520 having a diameter $d_3$ may be inserted therethrough. Furthermore, in the exemplary embodiment, clamp support 510 is coupled to base 506 using at least one fastener 528. Alternatively, clamp support 510 may be coupled to base 506 by welding, unitary design with base 506, or any other suitable means.

In the exemplary embodiment, plunger clamp assembly 508 includes rod 520, a plunger clamp 521, and a handle 522. Rod 520 extends through a rod stop 524, plunger clamp 521, and the clamp support aperture such that rod 520 is movable within plunger clamp 521 and clamp support 510. More specifically, rod 520 is slidably movable in an axial direction with respect to plunger clamp 521 and clamp support 510. Furthermore, in the exemplary embodiment, plunger clamp 521 is coupled to clamp support 510 using a plurality of fasteners 526. Alternatively, plunger clamp 521 may be coupled to clamp support 510 using welding, unitary construction, or any other suitable coupling means. In the exemplary embodiment, rod 520 is coupled to adjustable jaw 512 using any suitable coupling means. Rod 520 moves adjustable jaw 512 with respect to base 506 such that objects, such as, for example, blade ring segment 502 and shim 504, may be secured between adjustable jaw 512 and fixed jaw 514. Alternatively, a suitable clamp assembly other than plunger clamp assembly 508 may be used to secure adjustable jaw 512 within base 506, for example, but not limited to, a screw (not shown) that is similar to screw 116 and includes a threaded rod (not shown) coupled to adjustable jaw 512 for movement thereof.

In the exemplary embodiment, cam clamp assembly 516 secures a curved back face (not shown) of ring segment 502 to fixture 500. More specifically, cam clamp assembly 516 includes a shaft 530 and a lock nut 532. In the exemplary embodiment, lock nut 532 includes a patterned surface 534, such as, but not limited to, a raised, diamond pattern, to increase a friction force against lock nut 532. Furthermore, in the exemplary embodiment, lock nut 532 is treadably coupled to shaft 530. In the exemplary embodiment, base 506 and fixed jaw 514 each include an aperture (not shown) sized such that shaft 530 may be inserted therethrough. When lock nut 532 rotates on shaft 530, cam clamp assembly 516 tightens or loosens with respect to blade ring segment 502. In the exemplary embodiment, after ring segment 502 is substantially secured between fixed jaw 514 and adjustable jaw 512, cam clamp assembly 516 is tightened such that the back face of ring segment 502 is secured to fixture 500.

In the exemplary embodiment, cam shaft 530 is supported at a first end (not shown) by a bearing journal (not shown) coupled within base 506 and at a second end 531 by a threaded opening (not shown) defined in fixed jaw 514. More specifically, in the exemplary embodiment, shaft 530 is coupled to fixture 500 such that a cam shaft lobe diameter (not shown) may be variably positioned to enable cam shaft 530 to contact ring segment 502. As such, cam clamp assembly 516 facilitates supporting a plurality of ring segment diameters (not shown). Furthermore, in the exemplary embodiment, the bearing journal within base 506 is sized to enable cam shaft 530 to move substantially freely without binding. In the exemplary embodiment, the threaded opening and the journal bearing of cam clamp assembly 516 are substantially collinearly aligned with respect to a center line (not shown) of cam clamp assembly 516. In the exemplary embodiment, the center line is other than substantially coaxially aligned with an axis (not shown) of a central lobe diameter (not shown). Alternatively, the center line is coaxially aligned with the axis of the central lobe diameter. In the exemplary embodiment, the lobe central lobe diameter is selected to facilitate supporting a plurality of different ring segments.

In the exemplary embodiment, tenon clamp assembly 518 includes two tenon clamps 536 that each include a knob 538, a spring (not shown), and a clamp nut 540. More specifically, in the exemplary embodiment, one tenon clamp 536 is coupled to fixed jaw 514, and the other tenon clamp 536 is coupled to adjustable jaw 512. Adjustable jaw tenon clamp 536 extends through a slot 542 defined in base 506 such that tenon clamp 536 may move with adjustable jaw 512. Alternatively, fixture 500 may include more than one tenon clamp assembly 518. In the exemplary embodiment, each knob 538 includes a patterned surface 544, such as, but not limited to, a raised, diamond pattern, to increase a friction force against knob 538. When knobs 538 are rotated, tenon clamp assembly is loosen or tighten. In the exemplary embodiment, after ring segment 502 is substantially secured within fixture 500, tenon clamp assembly 518 is tightened to secure ring segment 502 against base 506.

In the exemplary embodiment, adjustable jaw 512 includes a right bushing block 546, and fixed jaw 514 includes a left bushing block 548. Alternatively, jaws 514 and 512 are oriented such that fixed jaw 514 includes right bushing block 546, and adjustable jaw 512 includes left bushing block 548. In the exemplary embodiment, each bushing block 546 and 548 is removably coupled to each respective jaw 512 and 514 using two dowels 550 and a fastener 552. Alternatively, bushing blocks 546 and 548 may be removably coupled to jaws 512 and 512, respectively, using any other suitable methods. Alternatively, bushing blocks 546 and 548 are permanently secured to jaws 512 and 514, respectively. Furthermore, in the exemplary embodiment, each jaw 512 and 514 includes a channel 554 defined therein that is shaped and sized essentially similarly to channel 138, as described above.

In the exemplary embodiment, fixed jaw 514 is coupled to base 506 via a plurality of fasteners, welding, adhesives, or any other suitable fastening method that facilitates securing fixed jaw 514 to base 506. More specifically, in the exemplary embodiment, adjustable jaw 512 is coupled to base 506 by coupling a dovetail (not shown) extending from jaw 512 into a dovetail slot (not shown) defined in base 506. The female dovetail slot and the dovetail are sized to enable a full range of intended linear movement of adjustable jaw 512 with respect to base 506 and to enable adjustable jaw 512 to remain in contact with ring segment 502. Moreover, in the exemplary embodiment, adjustable jaw 512 is secured to base 506 using plunger clamp assembly 508, as supported by clamp support 510, and with a plurality of fasteners 526.

In the exemplary embodiment, bushing plates 546 and 548 and rod 520 are aligned in a direction that is substantially parallel to an x-axis, and clamp support 510 and jaws 512 and 514 are aligned in a direction that is substantially parallel to a y-axis. As such, adjustable jaw 512 is movable within fixture 500 in a direction that is parallel to the x-axis such that ring segment 502 and shim 104 may be secured between adjustable jaw 512 and fixed jaw 514.

In the exemplary embodiment, each bushing block 546 and 548 includes at least one aperture 556 that is sized to receive a bushing 558 therein. More specifically, in the exemplary embodiment, bushing 558 is removably coupled to aperture 556 such that bushing 558 may be selected based on a drill bit (not shown), as described in more detail below.

Furthermore, in the exemplary embodiment, aperture 556 is oriented through bushing block 546 or 548 based on the size of ring segment 502 secured within fixture 500. More specifically, right bushing block 546 is shaped and sized similarly but opposite to, left bushing block 548. As such, right bushing block 546 and left bushing block 548 form a set, such as, but not limited to, 7FA+e blocks 546 and 548, or 9FA+e blocks 546 and 548. In the exemplary embodiment, blocks 546 and 548 may be selected such that left bushing block 548 and right bushing block 546 are from the same set, or left bushing block 548 and right bushing block 546 are from different sets. For example, but not limited to, both bushing blocks 546 and 548 may be from the 7FA+e set when a 7FB ring segment (not shown) is secured within fixture 500, or both bushing blocks 546 and 548 may be from the 9FA+e set when a 9FB ring segment (not shown) is secured within fixture 500.

In the exemplary embodiment, when a combination of blocks 546 and 548 is used, such combinations may be, for example, but not limited to, the examples shown in Table 1 below.

TABLE 1

| | | BLOCK NUMBER | |
|---|---|---|---|
| TURBINE | STAGE | Left side | Right side |
| 6B | 1, 2, 3, 4, 17, EGV1 | 2 LEFT | BLANK |
| 6FA | 0 | 2 LEFT | 2 RIGHT |
| 6FA | 1 | 4 LEFT | BLANK |
| 6FA | 2, 3 | 2 LEFT | BLANK |
| 6FA | 17 | 7 LEFT | NONE |
| 6FA + e | 0, 1 | 2 LEFT | 2 RIGHT |
| 6FA + e | 2, 3 | 2 LEFT | BLANK |
| 6FA + e | 17 | 5 LEFT (drill left hole only) | DO NOT FIT ANY PLATE |

TABLE 1-continued

| | | BLOCK NUMBER | |
|---|---|---|---|
| TURBINE | STAGE | Left side | Right side |
| 7E & 7EA | 1, 2, 3, 4, 17, EGV1 | 2 LEFT | BLANK |
| 7F & 7FA | 0, 1, 2, 3, 4 | 1 LEFT | 1 RIGHT |
| 7F & 7FA | 17, EGV1, EGV2 | 2 LEFT | BLANK |
| 7FA+ | 0, 1, 2, 3, 4 | 1 LEFT | 1 RIGHT |
| 7FA+ | 17, EGV1 | 2 LEFT | BLANK |
| 7FA + e & 7FB | 0, 1, 2, 3, 4 | 1 LEFT | 1 RIGHT |
| 7FA + e & 7FB | 17 | 5 LEFT | DO NOT FIT ANY PLATE |
| 7H | 17 | 2 LEFT | BLANK |
| 9E & 9EC | 1, 2, 3, 4 | 1 LEFT | 1 RIGHT |
| 9E & 9EC | 5, 6, 7, 8 | 3 LEFT | BLANK |
| 9E & 9EC | 17, EGV1 | 2 LEFT | BLANK |
| 9F, 9FA & 9FA + e | 0, 1, 2, 3, 4 | 1 LEFT | 1 RIGHT |
| 9F, 9FA & 9FA + e | 17, EGV1, EGV2 | 2 LEFT | BLANK |
| 9FB | 0, 1, 2, 3, 4 | 1 LEFT | 1 RIGHT |
| 9FB | 17 | 6 LEFT | DO NOT FIT ANY PLATE |
| 9H | 18 | 1 LEFT | 1 RIGHT |
| LMS100 | 0, 1 | 2 LEFT | 2 RIGHT |
| LMS100 | 2, 3, 4 | 2 LEFT | BLANK |

To secure ring segment 502 to fixture 500, in the exemplary embodiment, shim 504 is positioned between a back side (not shown) of bushing plates 546 and 548 and a front side (not shown) of ring segment 502. In one embodiment, shims 504 are positioned adjacent to a concave end (not shown) of segment 502. In another embodiment, shim 504 is adjacent to a segment face (not shown) other than a horizontal joint face of segment 502. In the exemplary embodiment, plunger clamp assembly 508 is positioned by axially sliding rod 520 with respect to base 506 such that adjustable jaw 512 contacts shim 504 and segment 502. Plunger clamp assembly 508 secures segment 502 and shim 504 in position using plunger clamp 521. Cam clamp assembly 516 is tightened against segment 502 by rotating lock nut 532 such that segment 502 is secured within fixture 500. Tenon clamp assembly 518 is tightened against segment 502 by rotating knobs 538 such that segment 502 is secured within fixture 500.

To use fixture 500 to form the shim aperture and the segment hole, a hand drill (not shown) as is known in the art is used. Alternatively, drill press 108 may be used to drill through fixture 500 positioned within a drill stand (not shown), as described above, or any other suitable drilling means may be used. The hand drill may include drill bit 160, as described above. In the exemplary embodiment, the shim aperture and segment hole are formed as described above, using the hand drill instead of drill press 108 and stand 106.

The above-described method and apparatus fabricates a component by facilitating securing the component in position with respect to a tool. The apparatus facilitates securing components during fabrication such that component movement is facilitated to be reduced. Furthermore, the apparatus facilitates aligning an aperture in a shim with a hole in a blade base. The apparatus also facilitates reducing a drilling time because the aperture and the hole are drilled concurrently. In addition, positions of apertures and holes are facilitated to be optimized by changing the position of the bushing based on the type of component being fabricated.

Exemplary embodiments of a method and apparatus to facilitate securing a component in position for fabrication are described above in detail. The apparatus is not limited to the specific embodiments described herein, but rather, components of the method and apparatus may be utilized independently and separately from other components described herein. For example, the apparatus may also be used in combination with other components to be fabricated, and is not limited to practice with only gas turbine engine blades and blade ring segments as described herein. Rather, the present invention can be implemented and utilized in connection with many other fabrication applications.

While the invention has been described in terms of various specific embodiments, those skilled in the art will recognize that the invention can be practiced with modification within the spirit and scope of the claims.

What is claimed is:

1. A method for forming an opening in two different turbine components, said method comprising:
   coupling a clamp to a base;
   defining a channel within an inner surface of the base, wherein the channel is sized to receive a flange of a turbine blade therein;
   coupling the clamp to a clamp bar, wherein the clamp bar is moveable with respect to the base;
   selecting a first bushing plate based on the first turbine component being drilled;
   removably coupling the first bushing plate to the base;
   removably coupling a bushing to at least one aperture extending through the first bushing plate;
   forming an opening in the first turbine component;
   selecting a second bushing plate based on the second turbine component being drilled, the second turbine component being different from the first turbine component;
   removably coupling the second bushing plate to the base; and
   forming an opening in the second turbine component.

2. A method in accordance with claim 1 further comprising coupling the first bushing plate to the clamp bar.

3. A method in accordance with claim 1 wherein coupling the clamp to a clamp bar comprises threadably coupling the clamp to the clamp bar.

4. A method in accordance with claim 1 wherein coupling a clamp to a base comprises coupling a plunger clamp to the base.

5. A method in accordance with claim 1 wherein selecting a first bushing plate comprises selecting a bushing plate that includes at least two bushing apertures defined therein.

6. A method in accordance with claim 1 comprising securing one of the first turbine component and the second turbine component between the clamp bar and one of the first bushing plate and the second bushing plate.

7. A method in accordance with claim 1 comprising securing one of the first turbine component and the second turbine component between the clamp bar and a base end, the base end extends outward from the base and is oriented in a direction perpendicular to an orientation of one of the first bushing plate and the second bushing plate.

8. A drilling tool for use in fabricating a plurality of different turbine components, said drilling tool comprising:
   a base comprising an inner surface defining a channel that is sized to receive a flange of a turbine blade therein;
   a clamp coupled to said base;
   a clamp bar coupled to said clamp, said clamp bar is moveable with respect to said base;
   a first bushing plate comprising at least one aperture extending therethrough, said first bushing plate is removably coupled to said base and is selected based on a first engine component being drilled;
   a second bushing plate comprising at least one aperture extending therethrough, said second bushing plate is removably coupled to said base and is selected based on a second engine component being drilled, the second turbine component is different from the first engine component; and
   a bushing removably coupled to at least one of said first bushing plate at least one aperture and said second bushing plate at least one aperture.

9. A drilling tool in accordance with claim 8 wherein said clamp comprises a threaded rod.

10. A drilling tool in accordance with claim 8 wherein said clamp comprises a plunger clamp.

11. A drilling tool in accordance with claim 8 wherein said at least one bushing plate comprises a plurality of apertures defined therein.

12. A drilling tool in accordance with claim 8 wherein said base comprises at least two bushing plates coupled thereto, each of said bushing plates comprises at least one aperture extending therethrough.

13. A drilling tool in accordance with claim 12 wherein at least one of said bushing plates is moveable with respect to said base, and at least one of said bushing plates is fixedly secured to said base.

14. A drilling tool in accordance with claim 8 further comprising a collar coupled to a drill bit to facilitate limiting a drill depth.

15. A drilling assembly for forming an opening in a plurality of blades, said drilling assembly comprising:
   a base comprising an inner surface defining a channel that is sized to receive a flange of a turbine blade therein;
   a clamp coupled to said base;
   a clamp bar coupled to said clamp, said clamp bar moveable with respect to said base;
   a first bushing plate comprising an aperture extending therethrough, said first bushing plate is removably coupled to said base and is selected based on a first turbine blade being drilled;
   a second bushing plate comprising an aperture extending therethrough, said second bushing plate is removably coupled to said base and is selected based on a second turbine blade being drilled, the second turbine blade is different from the first turbine blade;
   a bushing removably coupled to at least one of said first bushing plate at least one aperture and said second bushing plate at least one aperture;
   a drill bit coupled to a drill;
   a collar coupled to the drill bit to facilitate maintaining such that a drill depth; and
   a drill stand configured to facilitate maintaining a position of the base with respect to the drill bit.

16. A drilling assembly in accordance with claim 15 wherein said clamp comprises a threaded rod.

17. A drilling assembly in accordance with claim 15 wherein said clamp comprises a plunger clamp.

18. A drilling assembly in accordance with claim 15 wherein said first bushing plate comprises a plurality of apertures defined therein.

19. A drilling assembly in accordance with claim 15 wherein said base comprises at least two bushing plates coupled thereto, each of said bushing plates comprises at least one aperture extending therethrough.

20. A drilling assembly in accordance with claim 19, wherein at least one said bushing plate is moveable with respect to said base, and at least one said bushing plate is fixedly secured to said base.

* * * * *